United States Patent
Leslie-Hurd et al.

(10) Patent No.: US 10,180,854 B2
(45) Date of Patent: Jan. 15, 2019

(54) PROCESSOR EXTENSIONS TO IDENTIFY AND AVOID TRACKING CONFLICTS BETWEEN VIRTUAL MACHINE MONITOR AND GUEST VIRTUAL MACHINE

(71) Applicant: Intel Corporation, Santa Clara, CA (US)

(72) Inventors: Rebekah M. Leslie-Hurd, Portland, OR (US); Carlos V. Rozas, Portland, OR (US); Dror Caspi, Kiryat Yam (IL)

(73) Assignee: Intel Corporation, Santa Clara, CA (US)

( * ) Notice: Subject to any disclaimer, the term of this patent is extended or adjusted under 35 U.S.C. 154(b) by 266 days.

(21) Appl. No.: 15/278,592

(22) Filed: Sep. 28, 2016

(65) Prior Publication Data

US 2018/0088976 A1    Mar. 29, 2018

(51) Int. Cl.
*G06F 9/455* (2018.01)
*G06F 12/1045* (2016.01)
*G06F 12/0817* (2016.01)

(52) U.S. Cl.
CPC ...... *G06F 9/45558* (2013.01); *G06F 12/0828* (2013.01); *G06F 12/1045* (2013.01); *G06F 2009/45591* (2013.01); *G06F 2212/152* (2013.01); *G06F 2212/60* (2013.01); *G06F 2212/621* (2013.01); *G06F 2212/68* (2013.01)

(58) Field of Classification Search
None
See application file for complete search history.

(56) References Cited

U.S. PATENT DOCUMENTS

| 9,928,385 | B2 * | 3/2018 | Hars | G06F 21/64 |
| 2008/0140897 | A1 * | 6/2008 | Ganguly | G06F 12/1027 |
| | | | | 710/268 |
| 2012/0163589 | A1 | 6/2012 | Johnson et al. | |
| 2012/0296626 | A1 | 11/2012 | Bond et al. | |
| 2013/0232344 | A1 | 9/2013 | Johnson et al. | |

(Continued)

FOREIGN PATENT DOCUMENTS

WO    2016048478 A1    3/2016

OTHER PUBLICATIONS

PCT, International Search Report and Written Opinion for International Application No. PCT/US2017/051384, dated Dec. 15, 2017, 12 pages.

*Primary Examiner* — Bing Zhao
(74) *Attorney, Agent, or Firm* — Lowenstein Sandler LLP

(57) ABSTRACT

A processing system includes an execution unit, communicatively coupled to an architecturally-protected memory, the execution unit comprising a logic circuit to execute a virtual machine monitor (VMM) that supports a virtual machine (VM) comprising a guest operating system (OS) and to implement an architecturally-protected execution environment, wherein the logic circuit is to responsive to executing a blocking instruction by the guest OS directed at a first page stored in the architecturally-protected memory during a first time period identified by a value stored in a first counter, copy the value from the first counter to a second counter, responsive to executing a first tracking instruction issued by the VMM, increment the value stored in the first counter, and set a flag to indicate successful execution of the second tracking instruction.

18 Claims, 12 Drawing Sheets

(56) References Cited

U.S. PATENT DOCUMENTS

2014/0297962 A1* 10/2014 Rozas ................ G06F 12/0808
　　　　　　　　　　　　　　　　　　　　711/135
2015/0089502 A1　　3/2015 Horovitz et al.

* cited by examiner

US 10,180,854 B2

PROCESSOR EXTENSIONS TO IDENTIFY AND AVOID TRACKING CONFLICTS BETWEEN VIRTUAL MACHINE MONITOR AND GUEST VIRTUAL MACHINE

TECHNICAL FIELD

The present disclosure relates to processors and, more specifically, to a processor including circuit logics that implement instructions that identify and avoid enclave tracking conflicts between a virtual machine monitor (VMM) and a guest virtual machine (VM).

BACKGROUND

One approach for creating and maintaining a secured, protected, or isolated execution environment is to employ a secure enclave to protect code and data. A secure enclave is a protected area within an application's address space that is not accessible by other applications. A processor having the secure enclave capabilities prevents access to the enclave memory region (i.e., the protected area defined in the application's address space) by other software even if such access is attempted by higher-privileged software such as system software including the operating system and the virtual machine monitor (VMM).

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
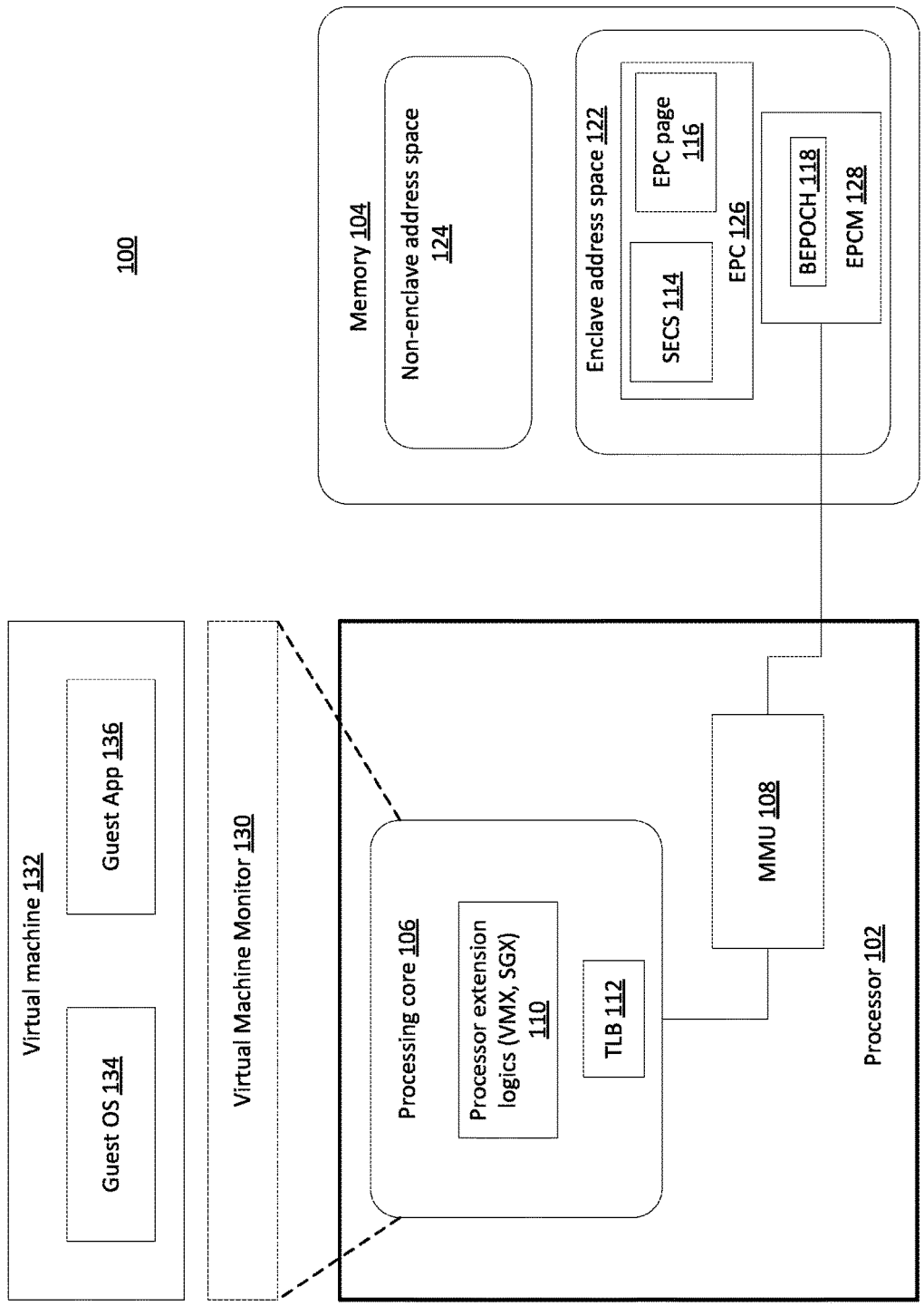
FIG. 1 illustrates a processing system according to an embodiment of the present disclosure.

Although the ring system may protect memory regions reserved for applications running at a higher privilege level against unauthorized accesses by application running at a lower (or equal) privilege level, the ring system does not protect data used by an application of lower privilege level against accessing by an application running at higher privilege levels. In certain situations, the application running at a higher privilege level (e.g., the operating system or the virtual machine monitor (VMM)) may have been compromised by malicious attacks. The compromised applications may make furthers attacks on data used by an application running at a lower privilege level. In some implementations, an application running on a processor at a lower privilege level (e.g., ring 3) may be provided with an architecturally protected memory region to store code and data that is private to the application and cannot be accessed by a higher privilege level application (e.g., an application with a ring 0-2 privilege). Thus, a processor may execute a portion or whole of the lower privileged application in the architecturally protected execution environment, protected against malicious attackers that pretend to have higher privileges.

In some implementations, the architecturally protected execution environment can be provided in the form of a secure enclave. A secure enclave may include a protected area within the memory address space associated with the application. An access to the enclave memory region by other software is prohibited even if such an access is attempted by system software.

In some implementations, the secure enclave is implemented on the processor reserved memory (PRM) that is protected by the processor from non-enclave memory accesses, including those accesses from the kernel of an operating system or the VMM. The PRM may include an Enclave Page Cache (EPC) including fixed-size pages (e.g., 4 KB per page) to store code and data associated with different secure enclaves. A secure enclave may be associated with a set of EPC pages that may be tracked by the processor through a data structure (referred to as the Enclave Page Cache Map (EPCM)). The EPCM may include a plurality of entries with each entry storing attributes of a corresponding EPC page associated with the secure enclave.

The EPC is managed by system software that manages the rest of computer's virtual and physical memory and cache storage. The system software can be a virtual machine monitor (VMM) and a kernel of an operating system (including a guest operating system (OS)) supported by the VMM.

The instructions to realize a secure enclave and its functionalities may be implemented through a processor extension logic circuit and microcode (referred to as the enclave logic) associated with a processor. To improve the efficiencies of secure enclaves, the enclave logic may implement instructions for allocating unused EPC pages to an enclave and free previously allocated EPC pages. When an EPC page is first accessed by enclave software, a translation lookaside buffer (TLB) may be used to store address mappings for the EPC pages associated with the secure enclave, where the mapping may include correspondences between the virtual addresses employed by applications and physical addresses of the memory. When a VMM is used, a two-level address translation may be used to translate the virtual address to the physical addresses, the two-level address translation including a virtual addresses to guest physical addresses translation and then a guest physical addresses to physical addresses translation.

In some implementations, both the guest OS and the VMM may execute instructions to initiate the process of evicting EPC pages associated with a secured enclave from an EPC. Since the address mapping for an EPC page may have been cached in a TLB entry that may have been used by multiple logic processors, the eviction of EPC pages by the guest OS and the VM may cause a security breach. For example, when a first logical processor holds a TLB entry to an EPC page, the first logical processor may continue to use the TLB entry if the EPC page still belongs to a secure enclave running on the first logical processor. If the EPC page is evicted by a second logical processor and is later allocated to another secure enclave. The first logical processor can still access the EPC page via the TLB entry even if the EPC page does not belong to the first secure enclave. This is a severe security breach.

In some implementations, the enclave logic may provide hardware support for tracking TLB mappings to an EPC page and ensure that any change to the secure enclave (e.g., EPC page write-out, permission change, or type change) are reflected on the TLB used by logical processors executing an application within the secure enclave. The support may include instructions for marking (a blocking instruction, e.g., EBLOCK), tracking (a tracking instruction, e.g., ETRACK), and evicting (an evicting instruction, e.g., EWB). The blocking instruction sets a block bit in an EPCM entry associated with an EPC page (e.g., BLOCKED bit to "1") to prevent further creation of new TLB mappings to the EPC page and allow the system software (e.g., the VMM or the guest OS) to issue requests for flushing TLB entries associated with the EPC page from a page table. Although the system software is expected to remove the TLB mappings, the system software cannot be trusted to perform the removal in a timely manner The processor may execute the tracking instruction to monitor if the TLB entries associated with the secure enclave have been flushed. The tracking instruction may employ a set of counters to store the number of logical processors that reference the TLBs and use the contents of these counters to ensure that an EPC page is free of any TLB mappings prior to execute the evicting instruction to safely evict the EPC page. The evicting instruction, when executed, may free the EPC page from a secure enclave after checking that no logical processor holds a TLB entry for the EPC page and allow the EPC page to be used by another secure enclave.

A conflict may occur during the tracking phase between a VMM and a guest OS that both execute a tracking instruction to monitor an EPC page. For example, after a VMM issues a blocking instruction and a tracking instruction to EPC pages of a secure enclave, a second tracking instruction issued by a guest OS on these EPC pages causes an unrecoverable error in the execution of the code in the virtual machine (the guest) including the guest OS. To avoid this potential conflict in the tracking phase, the VMM may need to suspend all enclave-related activities in the guest when issuing the tracking instruction. The suspension of all enclave activities in the guest, however, is not an efficient way to use the secure enclave.

Embodiments of the present disclosure provide for an enclave logic that keeps a record of a time division (referred to as an epoch) during which the guest OS issues a blocking instruction. A new epoch is created each time a tracking instruction is executed by a host (via the VMM) or by the guest (via the guest OS). An index number for the epoch in which the guest OS issues the blocking instruction on an EPC page is stored in a blocked epoch number counter (e.g., EPCM.BEPOCH) associated with the EPC page, and the tracking instruction implemented on the enclave logic may guarantee the execution of the tracking instruction issued by a guest OS when the value stored in the blocked epoch number counter is smaller than the current epoch value of the secure enclave. The current epoch value may have been increased by the VMM issuing the tracking instruction.

FIG. 1 illustrates a processing system according to an embodiment of the present disclosure. As shown in FIG. 1, processing system 100 (e.g., a system-on-a-chip (SOC)) may include a processor 102 and a memory device 104 communicatively coupled to processor 102. Processor 102 may be a hardware processing device such as, for example, a central processing unit (CPU) or a graphic processing unit (GPU) that includes one or more processing cores (not shown) to execute software applications. Processor 102 may further include one or more processing cores 106 and a memory management unit (MMU) 108 for performing memory address translation for processing core 106. Processing cores 106 may be associated with multiple level caches (not shown) including level L1-L3 caches.

Figure 6:
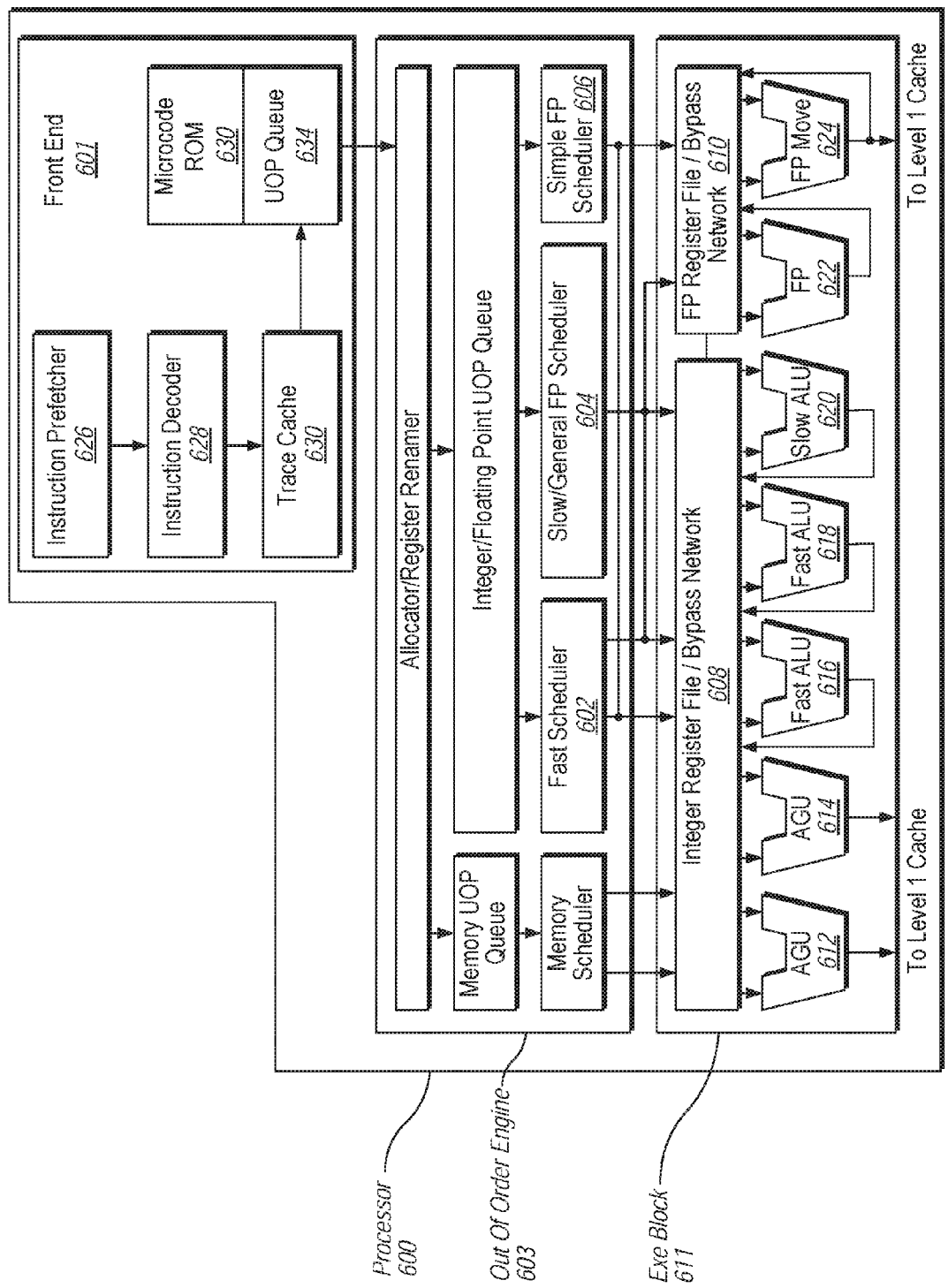
FIG. 6 illustrates a block diagram of the micro-architecture for a processor that includes logic in accordance with one embodiment of the disclosure.
Figure 7:
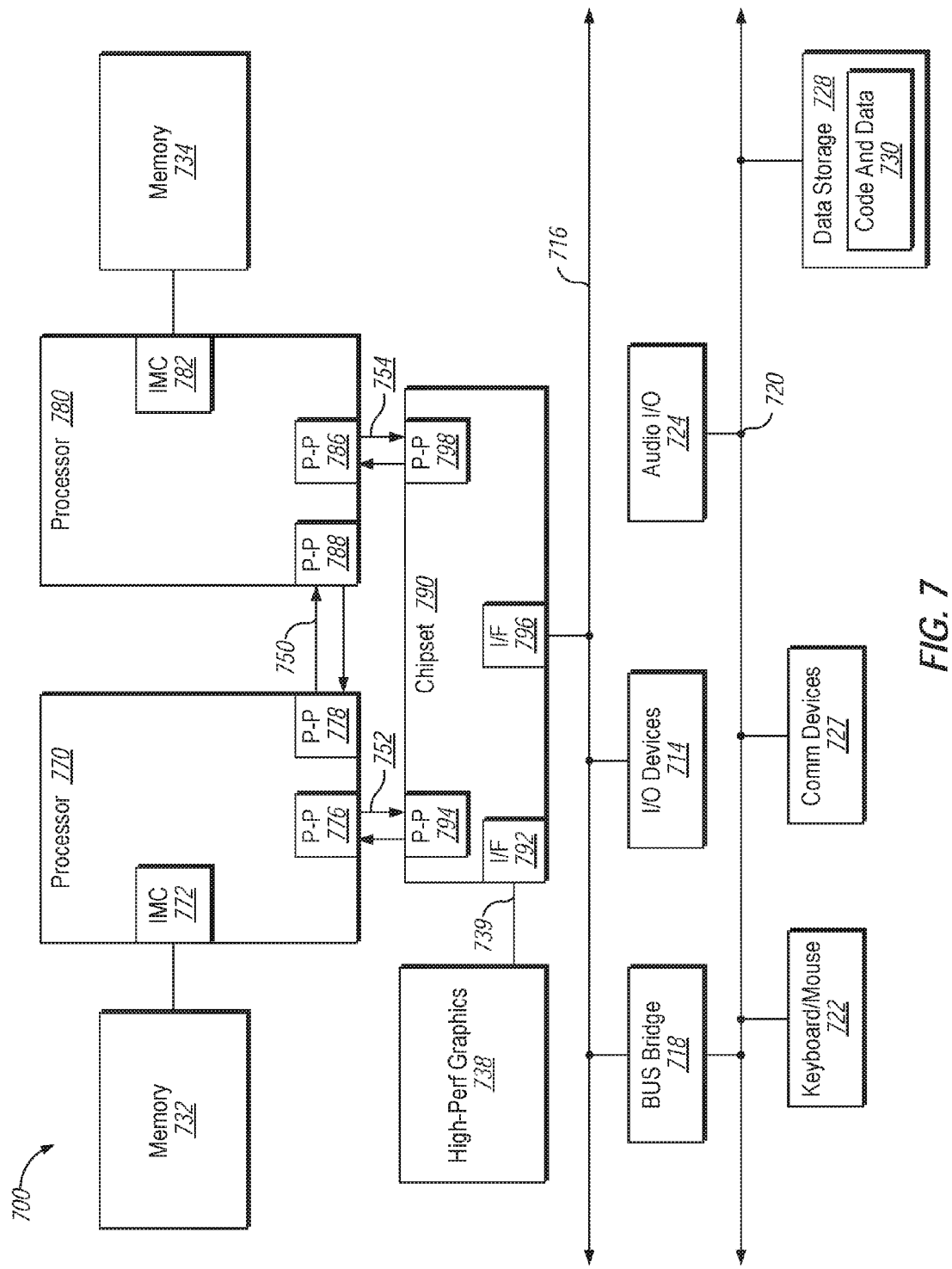
FIG. 7 is a block diagram illustrating a system in which an embodiment of the disclosure may be used.

Processing cores 106 in various implementations may be provided by in-order cores or out-or-order cores. In an illustrative example, processing core 106 may have a micro-architecture including processor logic and circuits used to implement an instruction set architecture (ISA). Processors 102 with different micro-architectures can share at least a portion of a common instruction set. For example, the same register architecture of the ISA may be implemented in different ways in different micro-architectures using various techniques, including dedicated physical registers, one or more dynamically allocated physical registers using a register renaming mechanism (e.g., the use of a register alias table (RAT), a reorder buffer (ROB) and a retirement register file), as illustrated by FIGS. 6-7.

Processor 102 may further include processor extension logic circuits 110 to implement extended instruction sets to support additional functionalities of processor 102. In one embodiment, processor extension logic circuits 110 may support execution of a set of virtualization instructions (e.g., virtual-machine extension (VMX)) to provide support for one or more virtualization environments ported on host. The VMX may provide processor-level support for virtual machines. In one embodiment, the VMX may include instructions to generate a virtual machine monitor (VMM) 130 that is a host program that allows one or more execution environments (or virtual machines (VMs) 132) to run on the host. VMM 130 may create and run virtual machines (VMs) 132.

VMs 132 may behave like a hardware computing device to end users. For example, VMs 132 may each include a virtual processor (not shown) that emulates a hardware processor. The virtual processor associated with VMs 132 may support a respective guest operating system (guest OS) 134. Guest applications 146 may run within the environments of guest operating systems 134. Guest operating systems 134 (including kernels) can include a number of guest-OS components (or kernel components) to provide a number of services to guest applications 136. In one embodiment, these guest-OS components run at the same processor privilege level (e.g., the highest ring 0 privilege level). In one embodiment, the guest-OS-provided services may include scheduler, process management, I/O management, memory management, drivers (e.g., file system and volume drivers, mass storage drivers, and bus drivers), and code integrity management services. The ring 0-2 privilege levels are commonly referred to as the supervisor mode and the ring-3 privilege level is commonly referred to as the user mode.

Guest OS 134 may provide a scheduling service (scheduler) to the execution of guest application 136, and the scheduling service may allow the application's execution being carried out in threads. A thread of execution is the smallest sequence of program instructions that can be managed independently a task scheduler of an OS (e.g., the guest OS 134). The execution of a thread is carried out by a logical processor. The number of logical processors associated with a VM 132 may define the maximum number of threads that the guest OS 134 can handle. All these logical processors, when executing threads associated with the program code of guest application 136, may share a guest physical address space that may be mapped to a physical address space of memory 104 by memory management unit 108.

VMs 132 include guest OS 134 and guest application 136 may access memory 104 through a series of memory address mappings. Guest OS 118 may construct a guest virtual address (GVA) space and map the GVA space to a corresponding guest physical address (GPA) space for VM 132. GPA space may be organized according to guest memory pages that each has a pre-defined size. Each one of the guest memory pages may be associated with an identifier that uniquely identifies the guest memory page. Memory management unit 108 may map the GPA space associated with VM 132 to the host physical address (HPA) space of the memory 104 of a host. During execution of a guest application 136, responsive to a request to access memory 104, memory management unit 108 may map the virtual addresses used by the application to the host physical addresses so that the application can access memory 104. The HPA space may be organized according memory frames that each has a pre-defined size. Each one of the memory frames may be associated with an identifier (e.g. memory frame number) that uniquely identifies the memory frame. As discussed above, the execution of guest application 136 may be carried out in multiple threads on multiple logical processors that share the GPA space that is mapped to the HPA space of the memory.

In one embodiment, in addition to the VMX extensions, processor extension logic circuits 110 may include logic circuits (referred to as the enclave logic) to implement software safeguard extensions (SGX) instructions that, when executed, may perform services related to secure enclaves. The SGX instructions may include instructions to create (ECREATE), load (EADD), and initialize (EINIT). The system software may execute an enclave create instruction to create a secure enclave. The creation of the secure enclave may generate a new SGX enclave control structure (SECS) including fields to store attributes associated with the secure enclave. In one embodiment, the SECS may be stored in a special EPC page (referred to as an SECS page) that is not addressable by applications not residing in the secure enclave. The attributes in the SECS page may include an enclave identifier that uniquely identifies the secure enclave. The execution of the enclave creation instruction marks the newly created SECS as uninitialized.

While in the uninitialized state, the system software may execute the enclave load instruction to add code and data into the secure enclave. The EPC pages associated with the secure enclave may include regular EPC pages to store code and data, and Thread Control Structure (TCS) pages stored in dedicated EPC pages (referred to as TCS pages). Each TCS page may include fields to store attributes associated with a logical processor for executing a thread of the code in the enclave. After completion of loading a secure enclave, the system software may execute the enclave initiate instruction to launch the secure enclave. Once the secure enclave is launched, the code and data in the secure enclave is not accessible by other applications including system software applications.

An active secure enclave (after initialization) may be divided into an encrypted portion and a decrypted portion. The encrypted portion may reside in an unprotected memory (such as main memory or disk). The decrypted portion resides in EPC 126. EPC 126 is a protected memory region used by the processing system to temporarily store EPC pages (including the SECS page, the regular EPC pages, and the TCS pages) when they are not cryptographically protected.

MMU 108 can access EPC 126 residing within the enclave physical address space 122 assigned to the secure enclave stored in memory 104. The Enclave Page Cache Map (EPCM) 128 also residing the physical address space 122 is a protected structure employed by the processing system to store attributes of the EPC. Memory 104 may also include regions that can be referenced by a non-enclave address space 124. In one embodiment, EPCM 128 may be stored as a special EPC page. EPCM 128 may include one or more entries with each entry corresponding to an EPC page in the EPC 126. Each EPCM entry may hold, in an implementation-dependent format, the following information: whether the EPC page is valid or invalid (VALID/INVALID); an identifier of the secure enclave instance that owns the page; the type of the page (REG, TCS, SECS); the virtual address through which the enclave is allowed to access the page; read/write/execute permissions for the page; whether the page is accessible or not (BLOCKED or UNBLOCKED).

System software may use EPCM 128 in the address translation flow to enforce access-control on the EPC pages loaded into the EPC 126. Various enclave-related functions may be implemented in the microcode, supported by the hardware implementations of SGX and the processing logic implementing the enclave functionality. In certain implementations, the processing logic may control the access to EPC 128 via translation lookaside buffer (TLB) 112 associated with processing core 106.

The mapping from the virtual addresses employed by virtual machine 132 and the physical addresses of memory 104 may be stored in translation lookaside buffer (TLB) 112 that may implement a mapping table for translating the addresses. TLB 112 may store the memory address mappings that have been used by logical processors to facilitate later repeated use of the memory address mappings. A "TLB hit" refers to a situation when a requested virtual address is present in the TLB. A "TLB miss" refers to the opposite situation: when the requested virtual address is not present in TLB 112, the address translation may proceed by looking up the page table. After the physical address is determined, the virtual address to physical address mapping may be entered into the TLB 112 for the convenience of address translation. The system software (e.g., VMM 130) may create entries in its page tables pointing to SECS page 114 that includes information to identify and mange a secure enclave. However, the system software cannot access the SECS page 114.

Each TLB entry may include one or more bits indicating identifying the enclave owning the memory location referenced by the TLB entry. Alternatively, if these bits are not provided, a TLB flush is performed when exiting the secure enclave to prevent unauthorized access to EPC 126.

Between the time when a secure enclave is initiated and the time when it is destroyed (e.g., by issuing an enclave remove instruction (e.g., EREMOVE)), the code in the enclave can be executed by any applications that have the enclave's EPC pages mapped into the virtual address spaces associated with these applications.

The enclave logic of processor 102 may implement an enclave entry instruction (EENTER) that, when executed, starts the execution of the code in the enclave and an enclave exit instruction (EEXIT) that, when executed, returns the execution control to back to the software application that invokes the enclave.

System software including the VMM 130 and guest OS 134 may perform memory address translation to perform page swapping (referred to as paging). Paging allows system software to overcommit EPC pages 116 by evicting rarely used EPC pages to a slower storage device such as a disk. Before an EPC page is evicted and freed up for use by another enclave, the enclave logic needs to ensure that no TLB entries have address translation associated with the EPC page to be evicted. The enclave logic provides instructions that, when executed, enable system software to safely evict EPC pages.

As discussed above, the enclave logic of processor 102 may support a blocking instruction (EBLOCK), a tracking instruction (ETRACK), and an evicting instruction (EWB). The blocking instruction sets the BLOCKED bit in the EPCM entry associated with an EPC page to prevent the creation of new TLB mappings to the EPC page. The tracking instruction may cause to increase the epoch number and the eventual eviction instruction (EWB) may detect whether all TLB entries associated with logical processors are flushed and the EPC page is free to be evicted. The evicting instruction may free the EPC page from a secure enclave and allow the EPC page used by another secure enclave.

In some implementations, since both VMM 130 and guest OS 134 can perform the safe eviction of EPC pages by executing the block instruction, the tracking instruction, and the evict instruction, a tracking conflict may occur when guest OS 134 issues a tracking instruction on a secure enclave after the VMM has already issued the tracking instruction on the secure enclave. The tracking conflict may result a fatal error for the guest OS 134. To avoid this situation, current implementations may require the VMM 130 to suspend all enclave activities associated with guest OS 134 after the VMM 130 issues a tracking instruction, which is not efficient.

Embodiments of the present disclosure provide for an enclave logic that keeps a record of time division (referred to as epoch) during which the guest OS issues a blocking instruction. The epoch may be stored in a epoch number counter 118 (e.g., whose value (BEPOCH) can be stored in a field of EPCM 128 (e.g., EPCM(target_page).BEPOCH)). The enclave logic may include implementation of the tracking instruction that identifies non-conflict situation based on the value stored in the epoch number counter 118 associated with the guest OS 134. The execution of the tracking instruction issued by guest OS 134 can then be guaranteed to complete without requiring the VMM 130 to suspend enclave activities associated with guest OS 134.

Figure 2:
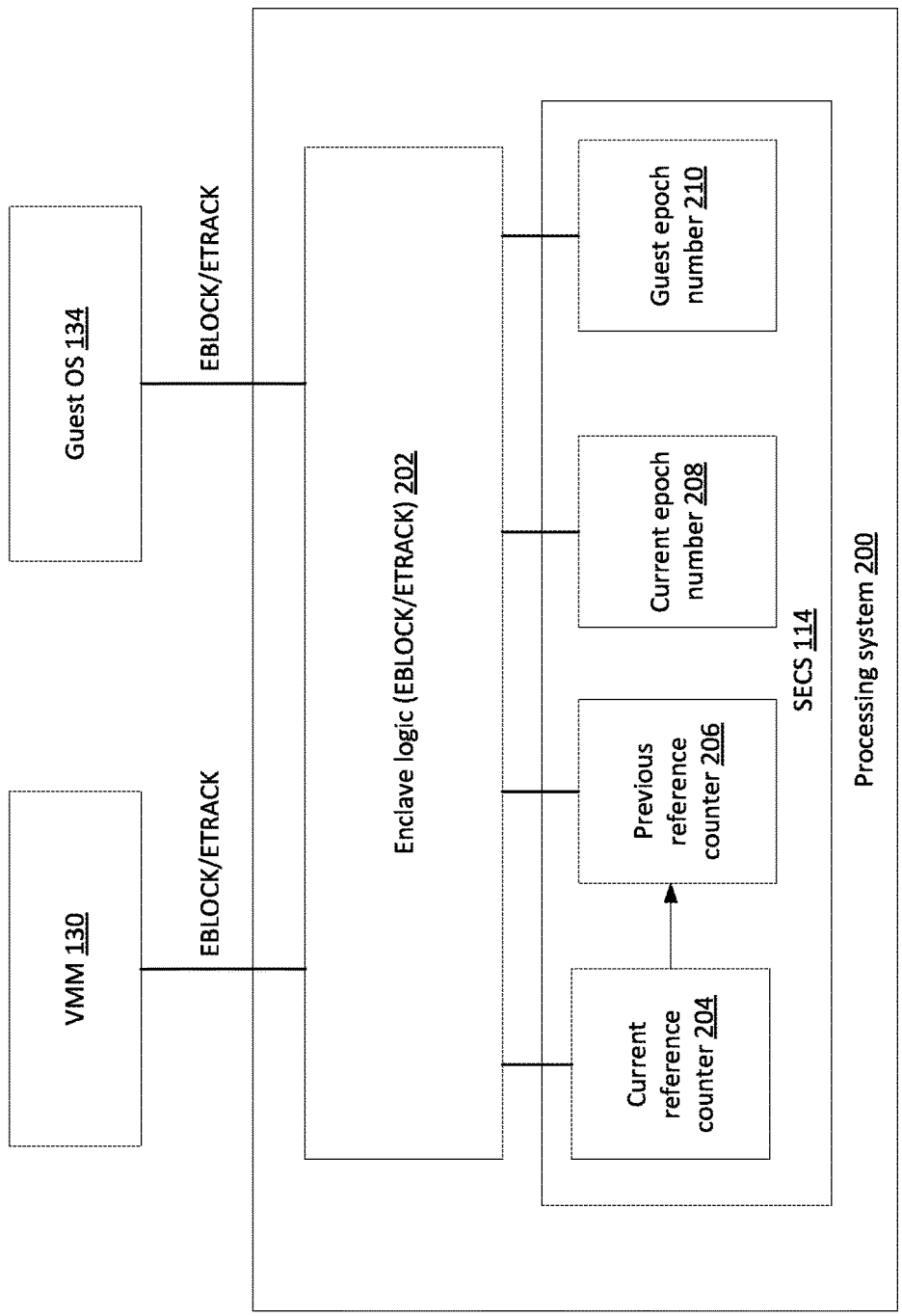
FIG. 2 illustrates a processing system for tracking EPC pages during an eviction according to an embodiment of the present disclosure.

FIG. 2 illustrates a processing system 200 for tracking EPC pages during an eviction according to an embodiment of the present disclosure. As shown in FIG. 2, processing system 200 may include enclave logic 202 that implements a blocking (EBLOCK) instruction and a tracking instruction (ETRACK) according to an embodiment of the present disclosure. System software applications such as VMM 130 and guest OS 134 may invoke the blocking instructions and the tracking instructions to prepare for eviction of EPC pages. Processing system 200 may further include a current reference counter 204, a previous reference counter 206, and a current epoch number counter 208. An EPCM entry may include a field to store a counter 210 for storing a most recent epoch number recorded in the epoch number counter (EPCM.BEPOCH) by guest OS 134 executing the blocking instruction (EBLOCK). In one embodiment, these counters may be implemented as attribute fields of SECS 114 associated with the secure enclave. The definitions for epoch numbers and reference counts are provided in the following.

Within the life cycle of a secure enclave, both VMM 130 and guest OS 134 may issue the blocking instruction referencing to an EPC page (e.g., EBLOCK(EPC_page_addr)) to prevent logical processors from creating new TLB entries relating to the EPC page. The execution of the blocking instruction sets the BLOCKED bit to one ("1") in the corresponding EPCM entry. One or more blocking instructions are followed by executing a tracking instruction to manage and monitor the flush of TLB entries relating to the EPC page. The execution of the blocking instruction by VMM 130 running on a host creates a new enclave time period (referred to as an epoch). For example, at the beginning of a secure enclave life cycle, the secure enclave is at epoch 1 (or other suitable integers). The epoch number (1) is recorded in the current epoch number counter 208. Responsive to executing (by VMM 130) a blocking and tracking instruction pair directed at an EPC page employed by the secure enclave, the enclave logic may cause to increase the current epoch number stored in counter 208 by one (current epoch number=2). Thus, each execution of the tracking instruction directed at an EPC page in the secure enclave causes to increase the current epoch number stored in counter 208 by one, and the current epoch number corresponds to the number of executions of the tracking instruction by VMM 130.

During each epoch (e.g., during epoch 2), the current reference counter 204 may record the number of logical processors (i.e., the number of threads) referencing the EPC page using TLB entries. The page table entries and corresponding EPCM entries are cached in TLB entries for the convenience of logical processors. However, the corresponding BLOCKED bit is set in the corresponding EPCM entry. In such cases, the logical processor may use the TLB entry for the page table translation without checking whether the BLOCKED bit is set in the corresponding EPCM entry. Responsive to the execution of a subsequent tracking instruction (e.g., ETRACK) by VMM 130, the enclave logic increases the current epoch number stored in counter 208 by one (e.g., to epoch 3), and copies the current reference number stored in counter 204 to the counter 206 which stores the previous reference number (or the reference number in the previous epoch) if the previous reference number in counter 206 at the time of copying is zero. Responsive to tracking instruction executed after the blocking instruction, system software may issue inter-processor interrupts (IPIs) to all logical processors referencing the EPC page, requesting them to exit the secure enclave. Upon the exit of the secure enclave, the TLB entries employed by the EPC pages for the memory address mapping are flushed and the previous reference number stored in counter 206 is correspondingly reduced. When all logical processors referencing the EPC page have successfully flushed their TLB entries, the value in counter 206 becomes zero, indicating that the EPC page is ready to be evicted.

In one embodiment, processing system 200 may include a counter 210 to store the epoch number of an epoch (referred to as a guest epoch number) in which guest OS 134 issues a blocking instruction. The counter 210 may be a field of SECS 114 of the secure enclave to store a copy of the latest blocked epoch number as set by a blocking instruction by the guest. The enclave logic may utilize the guest epoch number stored in register 210 to determine a subsequent tracking instruction issued by guest OS 134 is allowed to execute without regards to the tracking instruction already issued by VMM 130. If the value in counter 210 is smaller than the current epoch number stored in counter 208, the tracking instruction issued by guest OS 134 during the current epoch is guaranteed to a successful execution. The guarantee of success may include the avoidance to acquire a lock in the SECS 114 to secure the EPCM and elimination of the check of whether previous reference counter has reached the zero value. The ETRACK instruction does not cause any action (e.g., moving the secure epoch to a next epoch). In one embodiment, although the successful execution of the tracking instruction by guest OS 134 is guaranteed, the system software (e.g., the VMM) still generates inter-processor interrupts that inform logical processors to flush their TLBs.

In one embodiment, enclave logic 202 may execute the tracking instruction issued by guest OS 134. The execution may include a check for the membership (which secure enclave) and a check to ensure the target address is valid. During the execution, responsive to determining that the value (current epoch number) stored in counter 208 is greater than the value store in counter 210, the enclave logic 202 may set a flag to indicate the success of the execution of the tracking instruction and skip further execution of the tracking instruction. The enclave logic 202 may further check that previous reference counter 206 is zero and increase the guest epoch number stored in counter 210 to the current epoch number.

Figure 3:
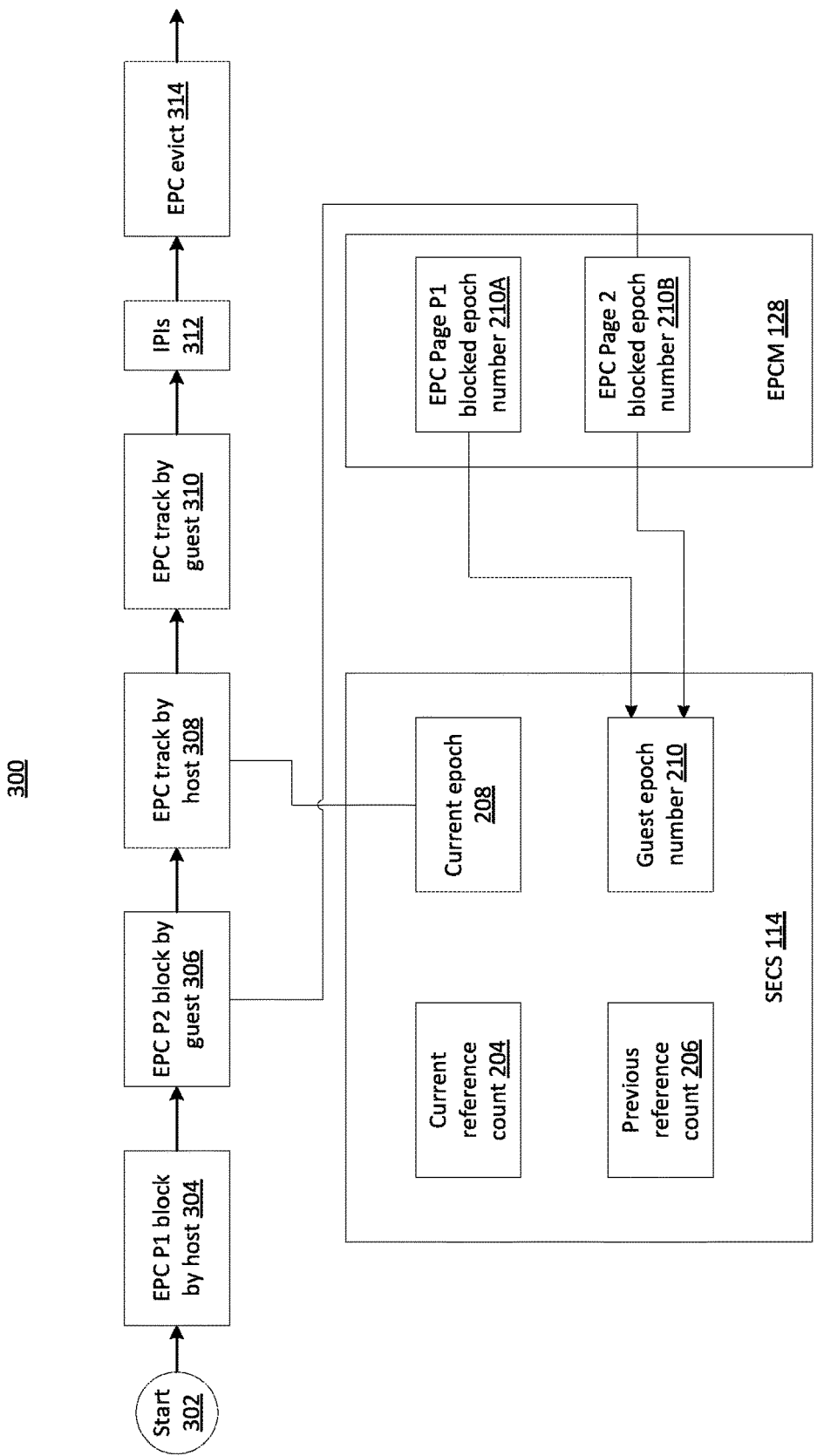
FIG. 3 illustrates part of a life cycle of an enclave according to an embodiment of the present disclosure.

FIG. 3 illustrates part of a life cycle 300 of an enclave according to an embodiment of the present disclosure. As shown in FIG. 3, at 302, system software (e.g., the operating system or the VMM) running on processor 102 (or processing core 108) may execute an enclave creation instruction to create an enclave. At start 302, a secure enclave may have been running during an epoch with the current epoch number being CE (e.g., 5). EPCM 128 may include counters 210A, 210B to store the epoch numbers of epochs in which the guest OS issues tracking instruction. For example, counter 210A may be associated with a first EPC page (p1), and counter 210B may be associated with a second EPC page (p2). The initial values stored in counter 210A, 210B may be zero. At 304, the host via the VMM may execute a first blocking instruction directed at a first EPC page (p1) of the secure enclave. The first blocking instruction may prevent the creation of further referencing to the first EPC page (p1). Subsequently, at 306, a guest OS may execute a second blocking instruction directed at a second EPC page (p2) of the secure enclave. The second blocking instruction may prevent the creation of further referencing to the second EPC page (p2) and record the current epoch number (CE=5) in counter 210B associated with the second EPC page. The current epoch number (CE=5) in counter 210B may be copied to counter 210. Subsequently, at 308, the host via VMM may execute a first tracking instruction which may cause the current epoch number stored in counter 208 to increase by one (CE=6). The execution of the first tracking instruction may cause to copy the content of the current reference counter 204 to previous reference counter 206 if the previous reference counter is at zero. Subsequently, at 310, the guest OS may execute a second tracking instruction. The execution of the second tracking instruction may compare the value stored in counter 210 (CE=5) and the current epoch number (CE=6) stored in counter 208. If the current epoch number is greater than the epoch numbers stored in counter 210, the enclave logic may set a flag to indicate that the execution of the second tracking instruction is a success. At 312, the guest OS may issue inter-processor interrupts to logical processors, requesting them to exit software applications that use TLBs to access the enclave (thus flushing the TLBs). After the previous reference counter is set to zero by successfully flushing the TLBs, at 314, the second EPC page (p2) may be evicted.

Figure 4:
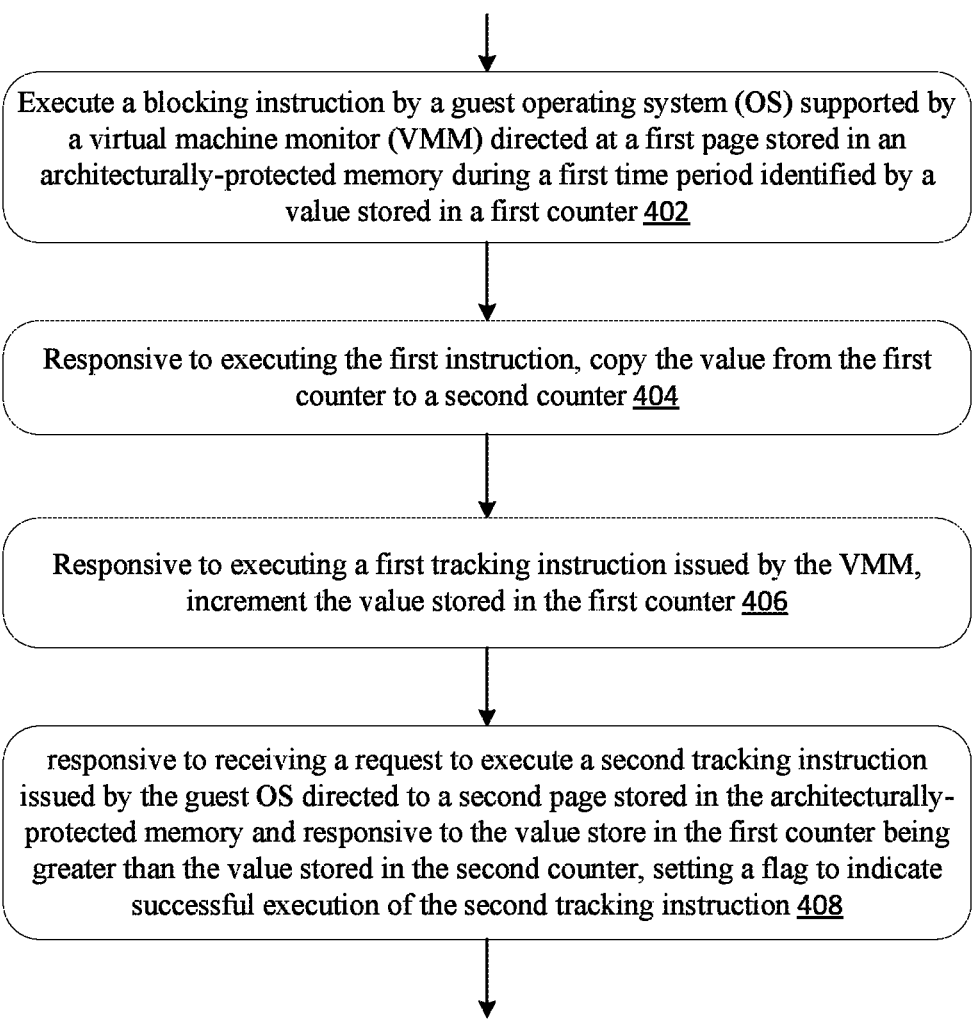
FIG. 4 is a block diagram of a method to determine the eviction of a page in an architecturally-protected memory according to an embodiment of the present disclosure.

FIG. 4 is a block diagram of a method 400 to determine the eviction of a page in an architecturally-protected memory according to an embodiment of the present disclosure. Method 400 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 400 may be performed, in part, by processing logics of processor 102 and SoC 100 as shown in FIG. 1.

For simplicity of explanation, the method 400 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 400 could alternatively be represented as a series of interrelated states via a state diagram or events.

Referring to FIG. 4, at 402, processor 102 may execute a blocking instruction by a guest operating system (OS) supported by a virtual machine monitor (VMM) directed at a first page stored in an architecturally-protected memory during a first time period identified by a value stored in a first counter.

At 404, responsive to executing the first instruction, processor 102 may copy the value from the first counter to a second counter.

At 406, responsive to executing a first tracking instruction issued by the VMM, the processor may increment the value stored in the first counter.

At 408, responsive to receiving a request to execute a second tracking instruction issued by the guest OS directed to a second page stored in the architecturally-protected memory and responsive to the value store in the first counter being greater than the value stored in the second counter, processor 102 may set a flag to indicate successful execution of the second tracking instruction.

Figure 5A:
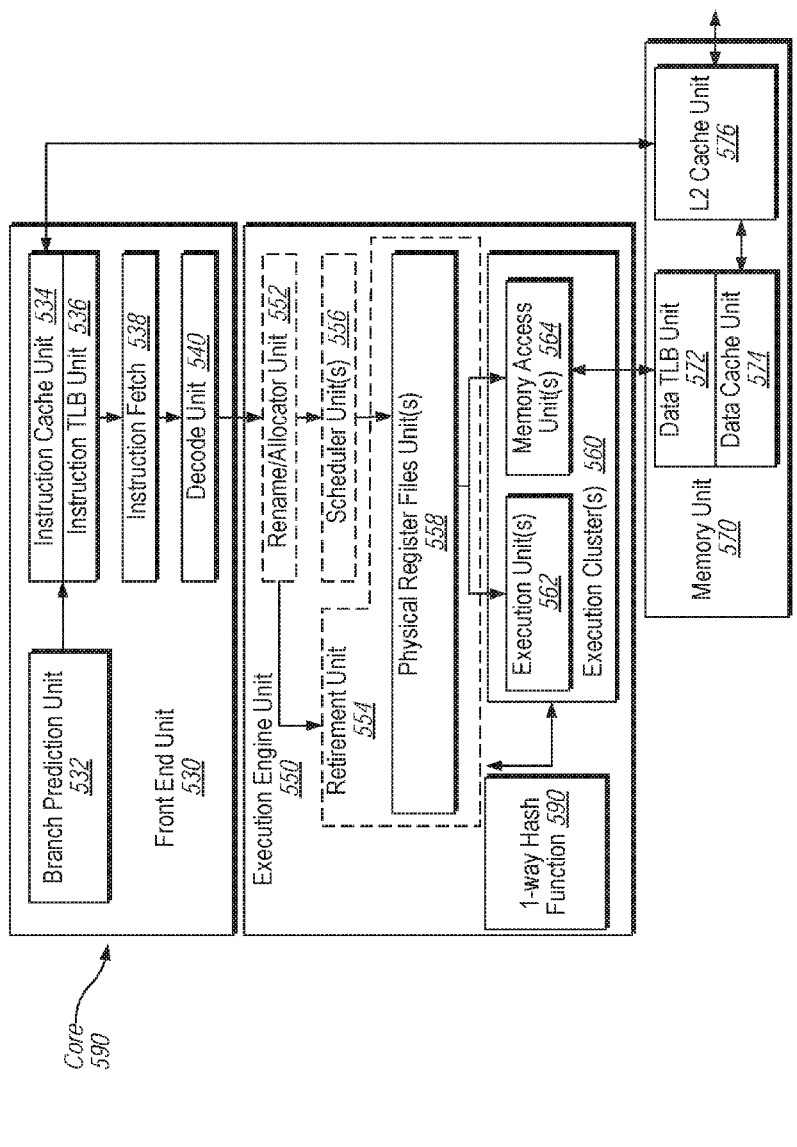
FIG. 5A is a block diagram illustrating a micro-architecture for a processor including heterogeneous core in which one embodiment of the disclosure may be used.

FIG. 5A is a block diagram illustrating a micro-architecture for a processor 500 that implements the processing device including heterogeneous cores in accordance with one embodiment of the disclosure. Specifically, processor 500 depicts an in-order architecture core and a register renaming logic, out-of-order issue/execution logic to be included in a processor according to at least one embodiment of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

In one implementation, processor 500 may be the same as processor 102 described with respect to FIG. 1.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefetching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5B:
FIG. 5B is a block diagram illustrating an in-order pipeline and a register renaming stage, out-of-order issue/execution pipeline implemented according to at least one embodiment of the disclosure.

FIG. 5B is a block diagram illustrating an in-order pipeline and a register renaming stage, out-of-order issue/execution pipeline implemented by processing device 500 of FIG. 5A according to some embodiments of the disclosure. The solid lined boxes in FIG. 5B illustrate an in-order pipeline, while the dashed lined boxes illustrates a register renaming, out-of-order issue/execution pipeline. In FIG. 5B, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5B.

FIG. 6 illustrates a block diagram of the micro-architecture for a processor 600 that includes hybrid cores in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that can bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 622, 624, can be implemented to support a range of operands having bits of various widths. For one embodiment, the floating point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement store address prediction for memory disambiguation according to embodiments of the disclosure. In one embodiment, the execution block 611 of processor 600 may include a store address predictor (not shown) for implementing store address prediction for memory disambiguation.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Referring now to FIG. 7, shown is a block diagram illustrating a system 700 in which an embodiment of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement hybrid cores as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
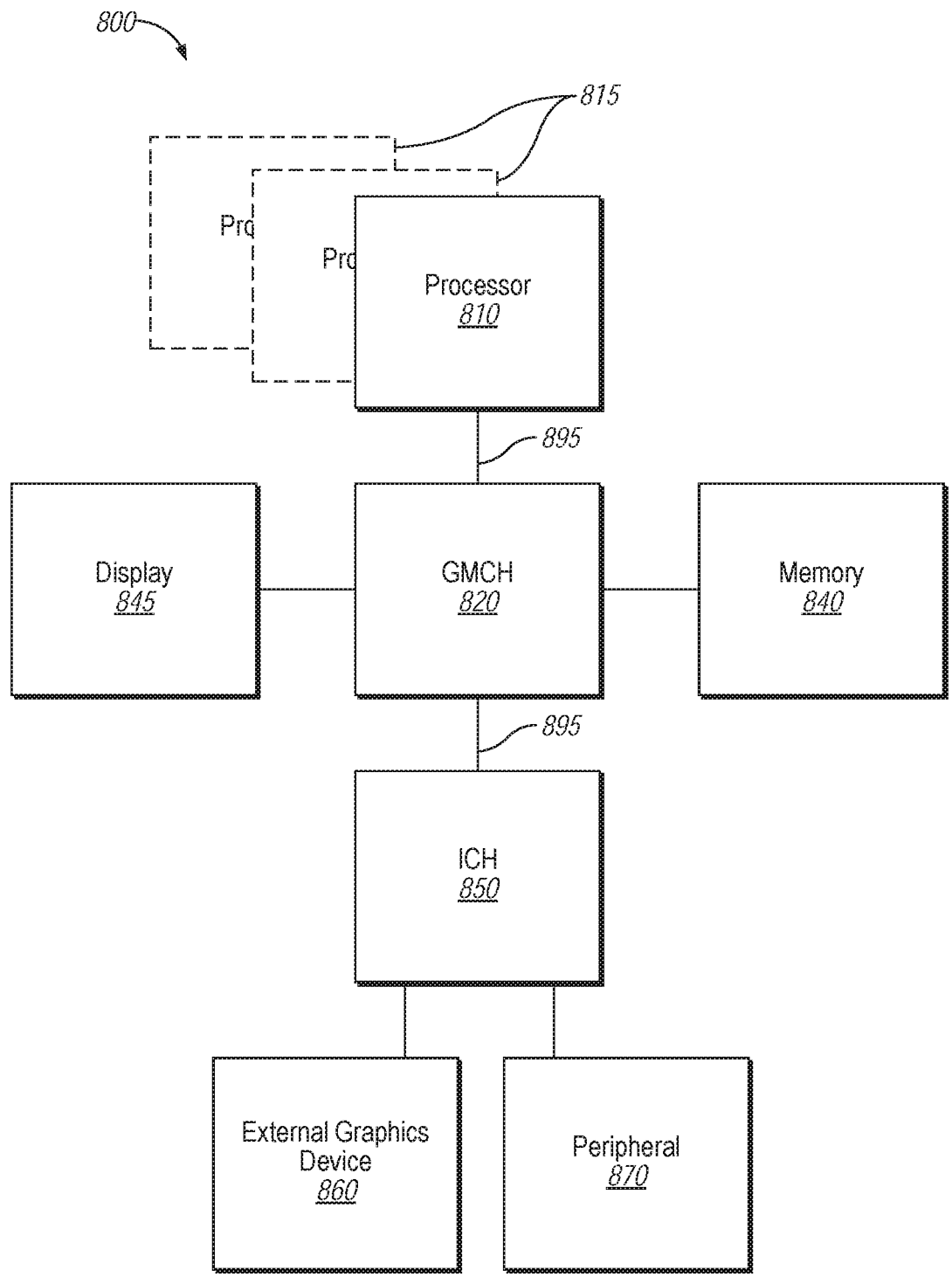
FIG. 8 is a block diagram of a system in which an embodiment of the disclosure may operate.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines. In one embodiment, processors 810, 815 implement hybrid cores according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
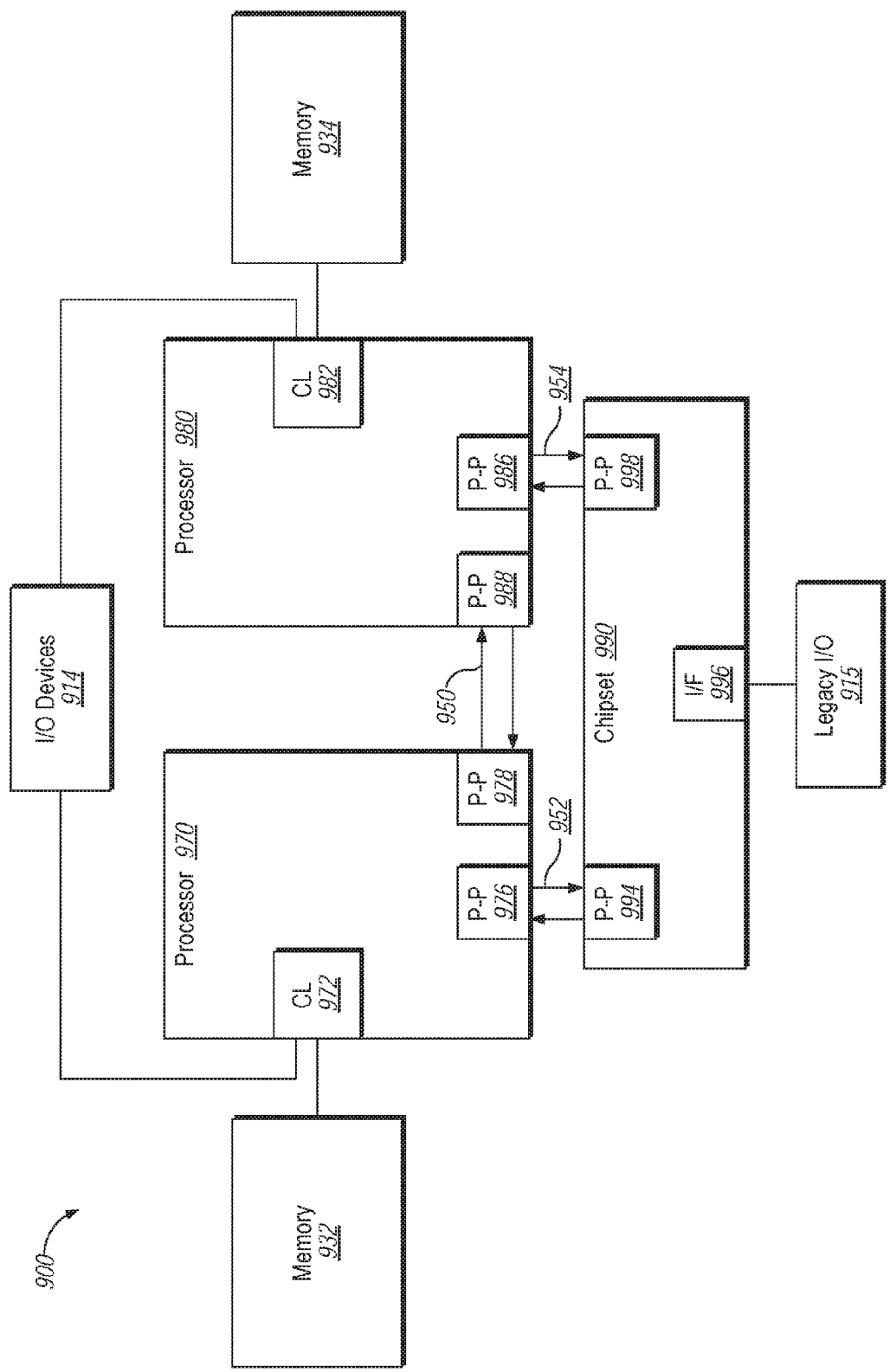
FIG. 9 is a block diagram of a system in which an embodiment of the disclosure may operate.

Referring now to FIG. 9, shown is a block diagram of a system 900 in which an embodiment of the disclosure may operate. FIG. 9 illustrates processors 970, 980. In one embodiment, processors 970, 980 may implement hybrid cores as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
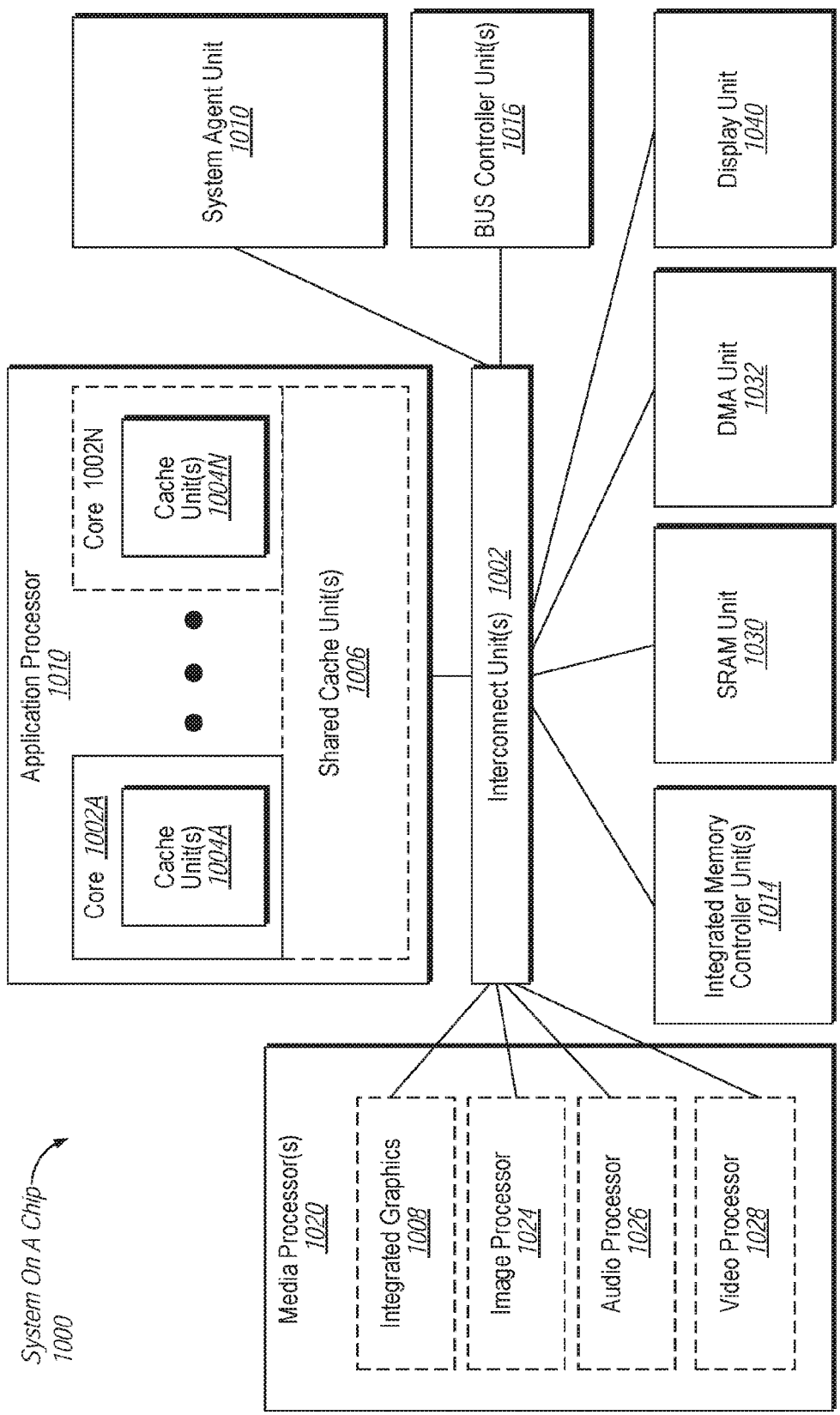
FIG. 10 is a block diagram of a System-on-a-Chip (SoC) in accordance with an embodiment of the present disclosure

Embodiments may be implemented in many different system types. FIG. 10 is a block diagram of a SoC 1000 in accordance with an embodiment of the present disclosure. Dashed lined boxes are optional features on more advanced SoCs. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a store address predictor for implementing hybrid cores as described in embodiments herein.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
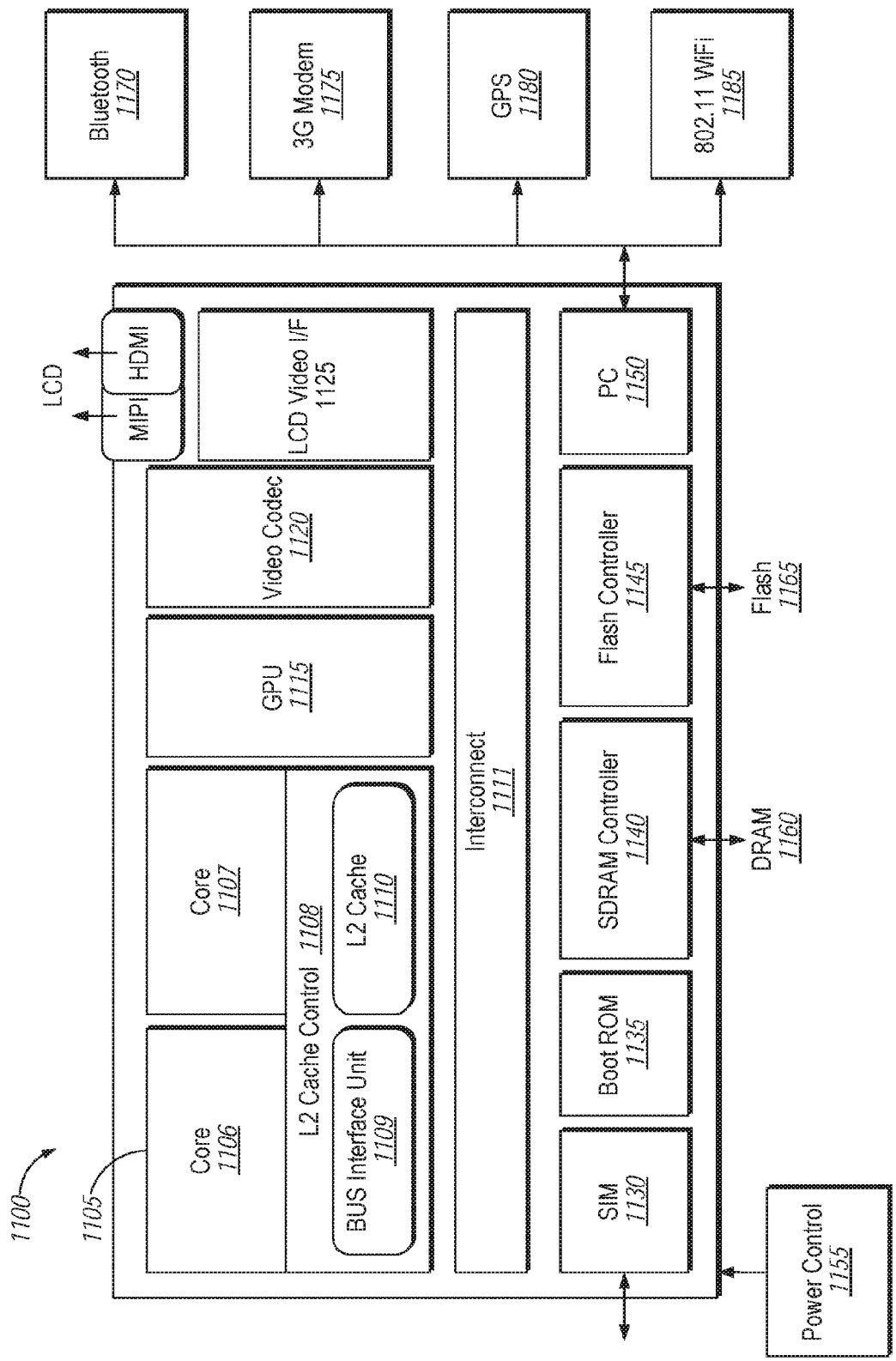
FIG. 11 is a block diagram of an embodiment of an SoC design in accordance with the present disclosure.

FIG. 11 is a block diagram of an embodiment of a system on-chip (SoC) design in accordance with the present disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters.

Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure. In one embodiment, cores 1106, 1107 may implement hybrid cores as described in embodiments herein.

Interconnect 1110 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
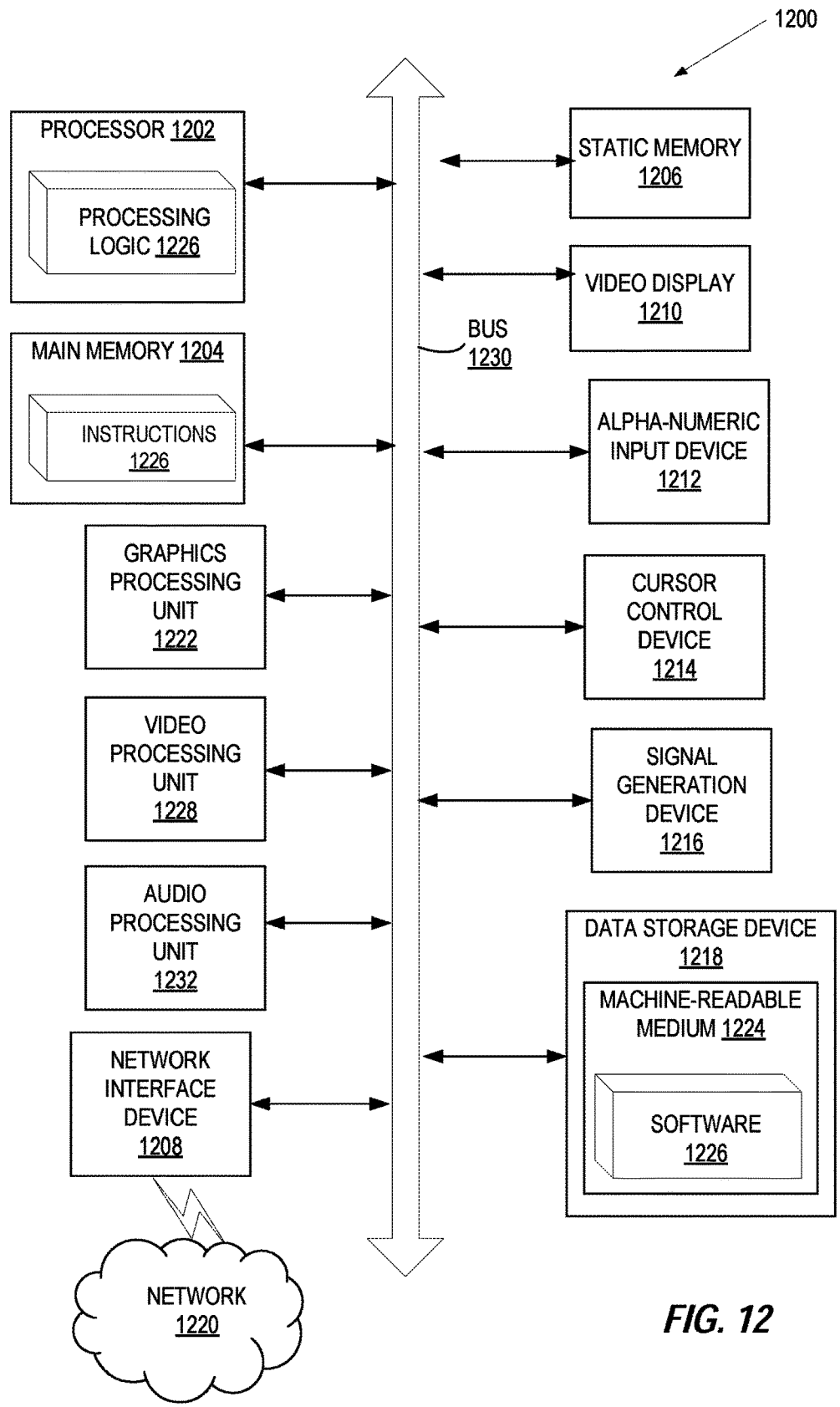
FIG. 12 illustrates a block diagram of one embodiment of a computer system.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations and steps discussed herein. In one embodiment, processing device 1202 is the same as processor architecture 100 described with respect to FIG. 1 as described herein with embodiments of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a machine-accessible storage medium 1224 on which is stored software 1226 implementing any one or more of the methodologies of functions described herein, such as implementing store address prediction for memory disambiguation as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The machine-readable storage medium 1224 may also be used to store instructions 1226 implementing store address prediction for hybrid cores such as described according to embodiments of the disclosure. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments. Example 1 is a processor including an execution unit, communicatively coupled to an architecturally-protected memory, the execution unit comprising a logic circuit to execute a virtual machine monitor (VMM) that supports a virtual machine (VM) comprising a guest operating system (OS) and to implement an architecturally-protected execution environment, wherein the logic circuit is to responsive to executing a blocking instruction by the guest OS directed at a first page stored in the architecturally-protected memory during a first time period identified by a value stored in a first counter, copy the value from the first counter to a second counter, responsive to executing a first tracking instruction issued by the VMM, increment the value stored in the first counter, and responsive to receiving a request to execute a second tracking instruction issued by the guest OS directed to a second page stored in the architecturally-protected memory and responsive to determining that the value store in the first counter is greater than the value stored in the second counter, set a flag to indicate successful execution of the second tracking instruction.

In Example 2, the subject matter of Example 1 can optionally provide that the architecturally-protected environment is a secure enclave execution environment implemented on the logic circuit.

In Example 3, the subject matter of any of Examples 1 and 2 can optionally provide that the architecturally-protected memory is provided by an enclave page cache (EPC) comprising a plurality of EPC pages.

In Example 4, the subject matter of Example 1 can optionally provide that the first blocking instruction is to prevent creating a new memory mapping to the first page in a translation lookaside buffer (TLB) referenced in the control data structure.

In Example 5, the subject matter of any of Examples 1 and 4 can optionally provide that the first tracking instruction is to track a number of logical processors associated with the VM having access to memory mappings to the first page in the TLB.

In Example 6, the subject matter of Example 5 can optionally provide that responsive to setting the flag to indicate the successful execution of the second tracking instruction, the guest OS is further to issue an inter-processor interrupt to request the logical processors to exit an application running in the secure enclave.

In Example 7, the subject matter of Example 1 can optionally provide that the EPC further comprises a control structure page comprising a first field to store the value of the first counter and comprises an EPC map (EPCM) structure comprising a second field to store the value of the second counter.

In Example 8, the subject matter of Example 1 can optionally provide that responsive to detecting that the flag indicates the successful execution, the logic circuit is further to execute an evicting instruction to evict the second page from the architecturally-protected memory.

In Example 9, the subject matter of Example 1 can optionally provide that the logic circuit is to responsive to executing the first tracking instruction by the VMM, store a number of logical processors referencing the architecturally-protected memory in a third counter.

Example 10 is a system-on-a-chip (SoC) comprising an architecturally-protected memory, and an execution unit, communicatively coupled to the architecturally-protected memory, the execution unit comprising a logic circuit to execute a virtual machine monitor (VMM) that supports a virtual machine (VM) comprising a guest operating system (OS) and to implement an architecturally-protected execution environment, wherein the logic circuit is to responsive to executing a blocking instruction by the guest OS directed at a first page stored in the architecturally-protected memory during a first time period identified by a value stored in a first counter, copy the value from the first counter to a second counter, responsive to executing a first tracking instruction issued by the VMM, increment the value stored in the first counter, and responsive to receiving a request to execute a second tracking instruction issued by the guest OS directed to a second page stored in the architecturally-protected memory and responsive to determining that the value store in the first counter is greater than the value stored in the second counter, set a flag to indicate successful execution of the second tracking instruction.

In Example 11, the subject matter of Example 10 can optionally provide that the architecturally-protected environment is a secure enclave execution environment implemented on the logic circuit.

In Example 12, the subject matter of any of Examples 10 and 11 can optionally provide that the architecturally-protected memory is provided by an enclave page cache (EPC) comprising a plurality of EPC pages.

In Example 13, the subject matter of Example 10 can optionally provide that the first blocking instruction is to prevent creating a new memory mapping to the first page in a translation lookaside buffer (TLB) referenced in the control data structure.

In Example 14, the subject matter of any of Examples 10 and 13 can optionally provide that the first tracking instruction is to track a number of logical processors associated with the VM having access to memory mappings to the first page in the TLB.

In Example 15, the subject matter of Example 14 can optionally provide that responsive to setting the flag to indicate the successful execution of the second tracking instruction, the guest OS is further to issue an inter-processor interrupts to request the logical processors to exit an application running in the secure enclave.

In Example 16, the subject matter of Example 10 can optionally provide that the EPC further comprises a control structure page comprising a first field to store the value of the first counter and comprises an EPC map (EPCM) structure comprising a second field to store the value of the second counter.

In Example 17, the subject matter of Example 10 can optionally provide that responsive to detecting that the flag indicates the successful execution, the logic circuit is further to execute an evicting instruction to evict the second page from the architecturally-protected memory.

In Example 18, the subject matter of Example 10 can optionally provide that the logic circuit is to responsive to executing the first tracking instruction by the VMM, store a number of logical processors referencing the architecturally-protected memory in a third counter.

Example 19 is a method comprising executing, by a processor, a blocking instruction by a guest operating system (OS) supported by a virtual machine monitor (VMM) directed at a first page stored in an architecturally-protected memory during a first time period identified by a value stored in a first counter, responsive to executing the first instruction, copying the value from the first counter to a second counter, responsive to executing a first tracking instruction issued by the VMM, incrementing the value stored in the first counter, and responsive to receiving a request to execute a second tracking instruction issued by the guest OS directed to a second page stored in the architecturally-protected memory and responsive to determining that the value store in the first counter is greater than the value stored in the second counter, setting a flag to indicate successful execution of the second tracking instruction.

In Example 20, the subject matter of Example 19 can further include responsive to detecting the flag to indicate the successful execution, executing an evicting instruction to evict the second page from the architecturally-protected memory.

Example 21 is an apparatus comprising: means for performing the subject matter of any of Examples 19 and 20.

Example 22 is a machine-readable non-transitory medium having stored thereon program code that, when executed by a processor, perform operations comprising executing, by the processor, a blocking instruction by a guest operating system (OS) supported by a virtual machine monitor (VMM) directed at a first page stored in an architecturally-protected memory during a first time period identified by a value stored in a first counter, responsive to executing the first instruction, copying the value from the first counter to a second counter, responsive to executing a first tracking instruction issued by the VMM, incrementing the value stored in the first counter, and responsive to receiving a request to execute a second tracking instruction issued by the guest OS directed to a second page stored in the architecturally-protected memory and responsive to determining that the value store in the first counter is greater than the value stored in the second counter, setting a flag to indicate successful execution of the second tracking instruction.

In Example 23, the subject matter of Example 22 can optionally provide that the operations further comprise responsive to detecting the flag to indicate the successful execution, executing an evicting instruction to evict the second page from the architecturally-protected memory.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing system, comprising:
   an execution unit, communicatively coupled to an architecturally-protected memory comprising a secure page cache, the execution unit comprising a logic circuit to execute a virtual machine monitor (VMM) that supports a virtual machine (VM) comprising a guest operating system (OS) and to implement an architecturally-protected execution environment,
   wherein the logic circuit is to:
      responsive to executing a blocking instruction by the guest OS directed at a first page stored in the architecturally-protected memory during a first time period identified by a value stored in a first counter, copy the value from the first counter to a second counter;
      responsive to executing a first tracking instruction issued by the VMM, increment the value stored in the first counter; and
      responsive to receiving a request to execute a second tracking instruction issued by the guest OS directed to a second page stored in the architecturally-protected memory and responsive to determining that the value stored in the first counter is greater than the value stored in the second counter, set a flag to indicate successful execution of the second tracking instruction.

2. The processing system of claim 1, wherein the architecturally-protected environment is a secure enclave execution environment implemented on the logic circuit.

3. The processing system of claim 1, wherein the first blocking instruction is to prevent creating a new memory mapping to the first page in a translation lookaside buffer (TLB) referenced in a control data structure.

4. The processing system of claim 3, wherein the first tracking instruction is to track a number of logical processors associated with the VM having access to memory mappings to the first page in the TLB.

5. The processing system of claim 4, wherein responsive to setting the flag to indicate the successful execution of the second tracking instruction, the guest OS is further to:
   issue an inter-processor interrupt to request the logical processors to exit an application running in a secure enclave.

6. The processing system of claim 1, wherein the secure page cache further comprises a control structure page comprising a first field to store the value of the first counter and comprises a secure page cache map structure comprising a second field to store the value of the second counter.

7. The processing system of claim 1, wherein responsive to detecting that the flag indicates the successful execution, the logic circuit is further to execute an evicting instruction to evict the second page from the architecturally-protected memory.

8. The processing system of claim 1, wherein the logic circuit is to:
   responsive to executing the first tracking instruction by the VMM, store a number of logical processors referencing the architecturally-protected memory in a third counter.

9. A system-on-a-chip (SoC) comprising:
   an architecturally-protected memory; and
   an execution unit, communicatively coupled to the architecturally-protected memory comprising a secure page cache, the execution unit comprising a logic circuit to execute a virtual machine monitor (VMM) that supports a virtual machine (VM) comprising a guest operating system (OS) and to implement an architecturally-protected execution environment,
   wherein the logic circuit is to:
      responsive to executing a blocking instruction by the guest OS directed at a first page stored in the architecturally-protected memory during a first time period identified by a value stored in a first counter, copy the value from the first counter to a second counter;
      responsive to executing a first tracking instruction issued by the VMM, increment the value stored in the first counter; and responsive to receiving a request to execute a second tracking instruction issued by the guest OS directed to a second page stored in the architecturally-protected memory and responsive to determining that the value stored in the first counter is greater than the value stored in the second counter, set a flag to indicate successful execution of the second tracking instruction.

10. The SoC of claim 9, wherein the architecturally-protected environment is a secure enclave execution environment implemented on the logic circuit.

11. The SoC of claim 9, wherein the first blocking instruction is to prevent creating a new memory mapping to the first page in a translation lookaside buffer (TLB) referenced in a control data structure.

12. The SoC of claim 11, wherein the first tracking instruction is to track a number of logical processors associated with the VM having access to memory mappings to the first page in the TLB.

13. The SoC of claim 12, wherein responsive to setting the flag to indicate the successful execution of the second tracking instruction, the guest OS is further to:
issue an inter-processor interrupts to request the logical processors to exit an application running in a secure enclave.

14. The SoC of claim 9, wherein the secure page cache further comprises a control structure page comprising a first field to store the value of the first counter and comprises a secure page cache map structure comprising a second field to store the value of the second counter.

15. The SoC of claim 9, wherein responsive to detecting that the flag indicates the successful execution, the logic circuit is further to execute an evicting instruction to evict the second page from the architecturally-protected memory.

16. The SoC of claim 9, wherein the logic circuit is to:
responsive to executing the first tracking instruction by the VMM, store a number of logical processors referencing the architecturally-protected memory in a third counter.

17. A method comprising:
executing, by a processor, a blocking instruction by a guest operating system (OS) supported by a virtual machine monitor (VMM) directed at a first page stored in an architecturally-protected memory during a first time period identified by a value stored in a first counter, wherein the architecturally-protected memory comprises a secure page cache;
responsive to executing the blocking instruction, copying the value from the first counter to a second counter;
responsive to executing a first tracking instruction issued by the VMM, incrementing the value stored in the first counter; and
responsive to receiving a request to execute a second tracking instruction issued by the guest OS directed to a second page stored in the architecturally-protected memory and responsive to determining that the value stored in the first counter is greater than the value stored in the second counter, setting a flag to indicate successful execution of the second tracking instruction.

18. The method of claim 17, further comprising:
responsive to detecting the flag to indicate the successful execution, executing an evicting instruction to evict the second page from the architecturally-protected memory.

* * * * *